Aug. 7, 1962  J. W. MOHLMAN  3,048,529
FLUIDIZED CATALYST REGENERATION
Filed July 30, 1958  2 Sheets-Sheet 1

INVENTOR.
John W. Mohlman
BY Gerald Rose
ATTORNEY

Aug. 7, 1962  J. W. MOHLMAN  3,048,529
FLUIDIZED CATALYST REGENERATION
Filed July 30, 1958  2 Sheets-Sheet 2
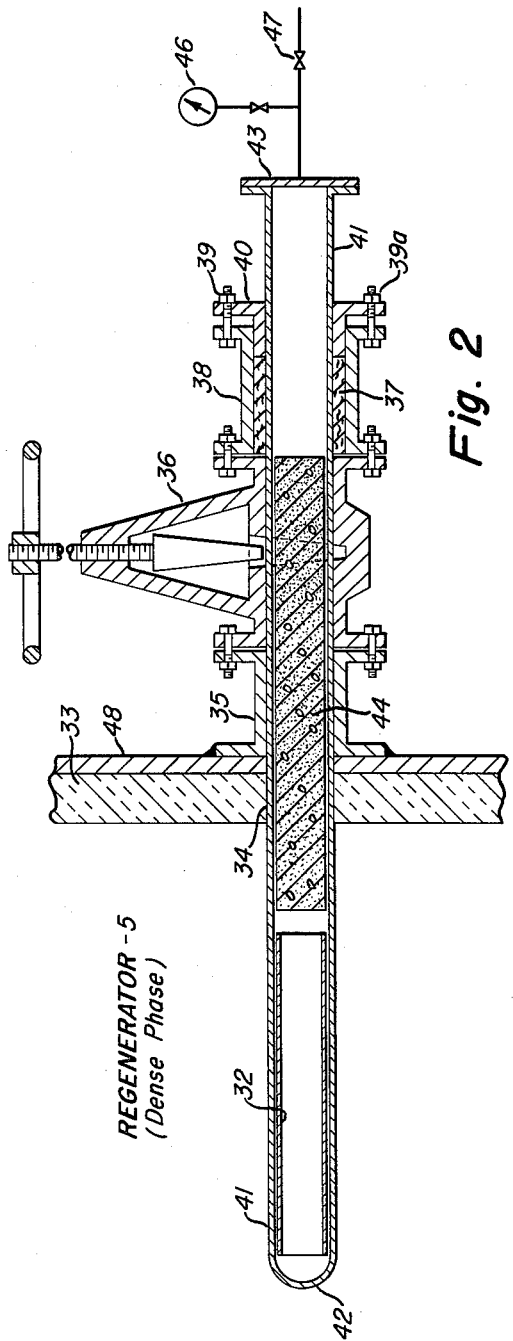
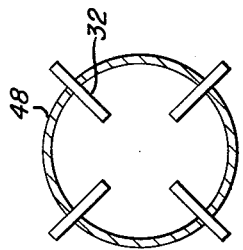
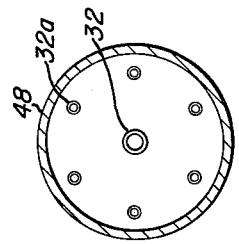
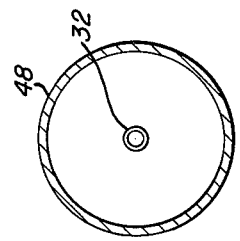
INVENTOR.
John W. Mohlman
BY Gerald Rose
ATTORNEY

United States Patent Office 3,048,529
Patented Aug. 7, 1962

3,048,529
FLUIDIZED CATALYST REGENERATION
John W. Mohlman, Chicago, Ill., assignor to Standard Oil Company, Chicago, Ill., a corporation of Indiana
Filed July 30, 1958, Ser. No. 751,969
7 Claims. (Cl. 204—154)

This invention relates to hydrocarbon conversion processes employing fluidized catalysts, and more particularly is concerned with an improved method of regenerating the fluidized particulate solid catalysts used in said processes. The invention provides means for increasing the rate at which fluidized catalysts may be regenerated.

Fluidized catalyst techniques have seen rapid development and advancement in the petroleum refining industry. They have found wide acceptance in several hydrocarbon conversion processes where, during the conversion reaction, a catalyst becomes coated with carbonaceous deposits and, to maintain high catalyst activity, a portion of the catalyst is cycled to a regeneration zone where an oxygen-containing gas such as air is employed to burn the deposits from the catalyst particles, thereby restoring initial activity. Fluid catalytic cracking units and, to a lesser extent, fluid catalytic hydroformers have contributed immeasurably toward satisfying the market demand for large volumes of high octane premium motor gasolines. However, in the present race toward ever higher octane numbers, fluid catalytic conversion units built in the 1940's and early 1950's have been forced to operate at conversion levels and feedstock rates substantially above those for which they were originally designed. As a result, many units are operating under conditions which are far from being optimum in order to satisfy the demand for octane numbers.

In existing fluid catalytic cracking and hydroforming units, when attempting to increase the feedstock rate or operating severity, the most common bottleneck, technically speaking, is the capacity of the unit to effectively and economically regenerate catalyst. As the severity level and throughput rate are increased, larger amounts of carbonaceous material or "coke" are deposited on the catalyst, and in order to maintain satisfactory catalyst activity it is essential that these deposits be burned off. The usual method of increasing regenerator capacity, in terms of weight of coke burned in a given time, has been to increase the air input rate. Since, however, the rate of combustion of these deposits is normally substantially constant at a given regenerator temperature, when higher feed rates, higher conversion severities or heavier feeds increase the coke make, a proportionately longer regenerator residence or burning time is necessary to reduce residual coke on the regenerated catalyst to the desired level. While in theory it would be possible to increase regenerator residence time by raising the dense bed level, or to improve the combustion rate by increasing the temperature, as a practical matter neither of these are attractive. Regenerator bed level and temperature are not independent variables but instead are interrelated with variables on the reaction side of the process, and a change in regenerator conditions is inevitably accompanied by, or would require, a series of compensating changes in reactor temperature, bed level, or catalyst-oil ratio. Furthermore, a higher regenerator level would correspondingly decrease the regenerator disengaging space, thus tending toward higher catalyst loss through the stack, and a higher regenerator temperature, even if attainable, could lead to catalyst sintering. At any event, it has generally been impossible to increase regenerator coke-burning capacity without effecting overall process variables in a manner which departs from optimum conditions. It is a primary object of the instant invention to provide a method for increasing regenerator coke-burning capacity without requiring major changes in either regenerator or reactor operating conditions.

According to the practice of the invention, fluidized particulate solid catalysts which are employed in processes for catalytic conversion of hydrocarbons are regenerated by contact with an oxygen-containing gas under combustion conditions while in the presence of intense nuclear radiation. Nuclear radiations, the alpha and beta particles and gamma rays derived from nuclear disintegration reactions, have the ability to materially increase the rate at which carbonaceous materials react with oxygen. At a comparatively low temperature of 572° F. the oxidation rate of graphite increases 16 percent in a 200,000 roentgens per hour gamma field, while a 610,000 (r./hr.) intensity provides a 160 percent increase. Although the improvement in combustion rate diminishes somewhat at higher temperatures, at combustion temperatures an intensity or flux which provides a dose rate of at least about 10,000 roentgens per hour throughout a major portion of the combustion (regenerator dense phase) zone is capable of effecting a substantially higher burning rate, although for optimum results a flux of from about 50,000 to about 500,000 or more r./hr. is preferred. Thus, in accordance with the invention, by increasing the combustion rate in the regeneration zone with nuclear radiation, higher feed rates and/or operating severities may be attained in existing fluid catalytic cracking and hydroforming units without the need for changing either reactor or regenerator conditions. Similarly, new fluid catalytic conversion units may be designed with smaller regenerators, thereby reducing equipment cost and initial catalyst investment.

As sources of nuclear radiation, radioactive isotopes emitting gamma rays, i.e. electromagnetic radiation having a frequency of from about $3 \times 10^{18}$ to about $3 \times 10^{21}$ cycles per second, corresponding to a wave length of between about $10^{-8}$ to about $10^{-11}$ centimeters, are preferred. Gamma radiation is capable of penetrating considerable thicknesses of material such as the fluidized solid catalysts, and hence only a relatively small number of gamma sources are necessary to provide satisfactory and relatively uniform radiation throughout the regeneration zone. Moreover, gamma sources may be shielded from direct contact with the oxidizing and abrasive atmosphere obtaining in the regenerator by the use of oxidation and erosion resistant ceramic or metal shields; gamma radiation easily passes through the shield, while any possibility of contaminating catalyst with abraded portions of the radioactive source is eliminated. On the other hand, alpha and beta radiation are somewhat more effective in promoting combustion rates, although these forms of nuclear radiation are attenuated by comparatively thin sections of shielding.

To produce nuclear radiation in the regeneration zone, a very convenient source comprises spent nuclear reactor fuel elements. Fuel elements, as they are initially manufactured for use in atomic reactors, contain fissionable uranium 233, uranium 235 or plutonium 239, and may contain fertile thorium 232 or uranium 238, the latter two isotopes forming fissionable uranium 233 and plutonium 239, respectively, by neutron capture in the reactor. After a period of use, these fuel elements accumulate a mixture of radioactive fission products or fragments. The fission fragments from, for example, uranium 235 include light isotopes with atomic masses ranging from 83 to 99 inclusive (atomic numbers 34 through 45), and heavy isotopes with atomic masses of 127–141 (atomic numbers 51–60). These fragments absorb neutrons and poison the neutron propagation reaction. Consequently, the "spent" fuel elements are withdrawn from the reactor core after several months and stored temporarily to permit dangerously radioactive isotopes having relatively short half lives to decay to more stable but nonetheless gamma-active isotopes. This storage is generally referred to as the "cooling" period, and may be from a week or so to as long as 100 days or more. At the end of a cooling period, the spent fuel elements still retain considerable gamma activity, due to the presence of such radioactive isotopes as columbium 95, zirconium 95, praseodymium 147, etc. After the cooling period, gamma activity remains potentially useful for a year or so and the spent fuel elements may be safely used for the process herein.

Where low cost radioactive isotopes are available, it is frequently convenient to employ high intensity gamma sources comprising these isotopes in lieu of spent reactor fuel elements. Cobalt 60 is obtained by exposing cobalt to a high neutron flux in an atomic reactor, and many other radioactive isotopes which have relatively long half lives are similarly produced. Other radioactive gamma emitters which have sufficiently long half lives for use herein include calcium 45, scandium 46, titanium 51, manganese 54, iron 59, zinc 65, selenium 75, zirconium 93, rhodium 102, tin 113, and cesium 134 and 137.

Concentrated waste fission products, which are gamma active isotopes obtained as byproducts in the recovery of fissionable elements from spent reactor fuel elements, are also effective and relatively low cost gamma radiation sources. These materials are available in various forms and are most commonly obtained as a mixture of metallic salts, which may be encased in suitable cannisters and employed as gamma radiation sources for use herein.

The invention will be more fully understood, and several embodiments thereof will be illustrated with reference to the attached drawings in which:

FIGURE 2 shows the details of a preferred installation for inserting and positioning a source of nuclear radiation into a fluidized catalyst regenerator.

Figure 1:
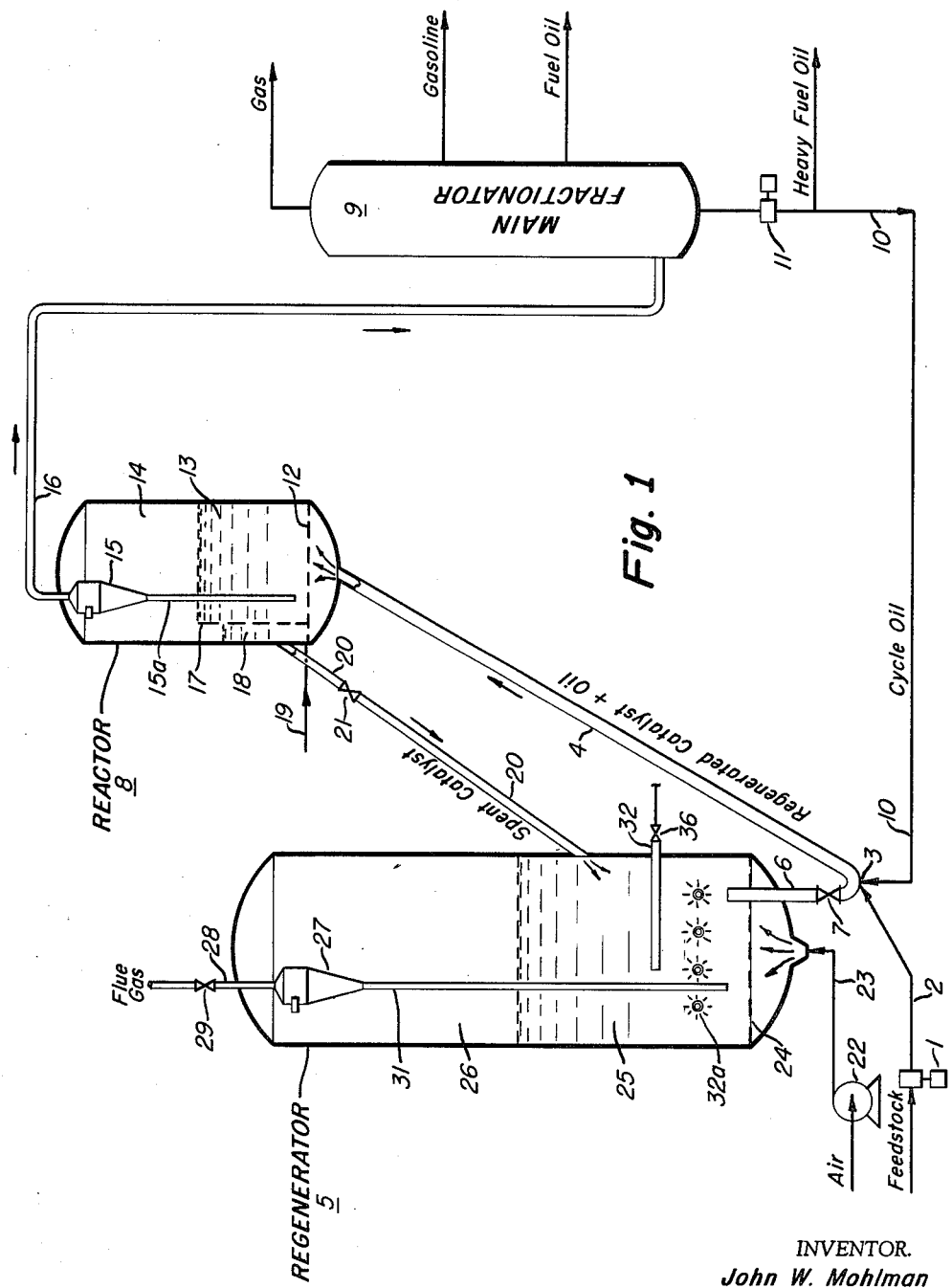
FIGURE 1 depicts a typical apparatus for conducting the fluid catalytic cracking of high boiling petroleum hydrocarbons to produce motor gasoline and other products, and which employs nuclear radiation to facilitate and improve catalyst regeneration.

FIGURES 3–a, 3–b, 3–c and 3–d are various arrangements of radioactive sources within a regenerator.

Referring to FIGURE 1, fluid catalytic cracking as shown in the figure involves the contacting of a heavy virgin or thermally cracked gas oil fraction, generally boiling in the range of about 450 to about 1000° F., with a cracking catalyst to yield large volumes of motor gasolines (approximately 150°–400° F. boiling range). Byproducts of the cracking reaction include light normally-gaseous hydrocarbons for polymerization and alkylation feedstocks and for liquified petroleum gas usages, together with considerable amounts of higher boiling cycle oils suitable as diesel and heater fuels. Any of the well known cracking catalysts, exemplified by silica alumina, silica magnesia or natural clay or "Filtrol" type catalysts may be used. The cracking catalyst comprises particles having a size range between about 10 and about 200 microns, and upon aeration behaves almost exactly as a liquid; the catalyst can flow through pipes, ripples and bubbles can form in it, and there is a very sharp line of demarcation between the dense catalyst bed and a dilute phase thereabove consisting of a very minor amount of entrained fluidized catalyst. Cracking conditions normally include a temperature within the range of about 850 to about 1000° F., more usually between about 875° and about 925° F. The cracking pressure may be from about atmospheric to about 50 p.s.i.g. or more, typically about 20 p.s.i.g. For regeneration, the catalyst is contacted with air or other oxygen-containing gas at a temperature in the range of about 1000 to about 1150° F., preferably about 1075–1125° F., and at a pressure of from about atmospheric to about 50 p.s.i.g.

Operations according to the cracking process described in FIGURE 1 commence with the introduction of gas oil feedstock obtained from storage by pump 1 and supplied through line 2 to juncture 3, at the entrance to reactor riser 4. At juncture 3, the oil is contacted with a stream of regenerated catalyst obtained from regenerator 5 by way of regenerated catalyst standpipe 6. This catalyst, which normally contains from about 0.01 to about 0.5% carbon, is supplied at a rate controlled by the action of regenerated catalyst slide valve 7 to regulate the temperature in reactor 8 at the desired level. Also supplied to juncture 3 is a stream of heavy cycle or slurry oil obtained from main fractionator 9 through line 10 and pump 11. This cycle oil comprises the heavy portion of hydrocarbon reaction products which are recycled to cracking reactor 8, and generally contains a small amount of catalyst not separated by cyclone 15.

Upon contacting the stream of regenerated catalyst descending through standpipe 6, the feedstock and cycle oils are vaporized and the mixture of entrained catalyst and vapor ascends through reactor riser 4 and enters the bottom of reactor 8 below grid 12. Grid 12 distributes the stream evenly throughout the bottom of dense phase 13 of catalyst. Conversion of the hydrocarbon stream to the various cracking reaction products occurs in dense phase 13, as well as in reactor riser 4. Hydrocarbon vapors ascend through dense phase 13 into dilute phase 14, and leave reactor 8 via cyclone 15 which removes the major amount of entrained catalyst particles, which are returned through dip leg 16 to dense phase 13. The reaction products leaving cyclone 15 pass through vapor line 16 to main fractionator 9 where they are fractionated to obtain intermediate products such as gas, gasoline, and fuel oil, which may be subsequently processed or refined to obtain the desired motor gasoline and other fractions.

Meanwhile, during the cracking reaction, catalyst becomes coated with carbonaceous deposits, thereby blocking the catalyst surface and reducing the catalyst activity. These deposits may have a composition of about 10 percent hydrogen and 90 percent carbon, and may be present on the catalyst in an amount ranging from about 0.3 to about 2.0 weight percent or more. Depending upon the cracking severity, carbonaceous deposits may constitute anywhere from about 2 to about 15 weight percent of the total feedstock. When coated with these deposits, the catalyst is referred to as "spent," and is withdrawn for regeneration from dense phase 13 in reactor 8 by means of perforated grid 17 and through stripper 18 where steam (supplied to line 19) is employed to strip any occluded liquid hydrocarbons from the spent catalyst. The catalyst then descends into spent catalyst standpipe 20, through which it flows by gravity into regenerator 5. The rate of catalyst withdrawal from reactor 8 is controlled by spent catalyst slide valve 21 operating as a level control for reactor 8.

In regenerator 5, the spent catalyst is regenerated by contacting the catalyst with air supplied by blower 22 through line 23, which after distribution by grid 24, is supplied to dense phase 25 where burning of carbonaceous deposits from the catalyst takes place. Combustion at the conditions of about 1000–1150° F. temperature removes the carbon to residual level of between about 0.1 and about 0.5% by weight, and at the same time effects heating of the catalyst from 850–1000° F. reactor temperature to the higher regenerator temperature. This temperature difference is used to supply heat to the feed stock and cycle oil for vaporization at juncture 3 and for the endothermic reaction in reactor 8. After combustion, the flue gas ascends from dense phase 25 into dilute phase 26, and is separated from entrained catalyst by cyclone 27 and thereafter leaves through flue gas stack 28 and flue gas slide valve 29. Entrained catalyst is returned to dense phase 25 via dip leg 31. While cyclone 27 in regenerator 5, and cyclone 15 in reactor 8, are shown as a single stage cyclone, it will be understood that a plurality or multiplicity of serially or parallel-connected cyclones may be used.

In accordance with the present invention, at least one fixed intense source of nuclear radiation (shown as sources 32, 32a, etc.) is positioned so as to radiate into the dense phase combustion zone 25 of regenerator 5. These sources 32 preferably have an intensity of at least 1000 curies each, and more desirably at least about 10,000 curies, e.g. 50,000 curies. For optimum benefits, they are arranged to provide a flux density of preferably at least about 10,000 roentgens per hour throughout a major portion of dense phase 25, and if sufficient sources of adequate intensity are available, a flux of 50,000–500,000 r./hr. is more desirable.

The optimum positioning of sources 32 depends on several factors, including the flux density and homogeneity desired, the intensity of source 32, physical size of the source, and size of regenerator 5. It is desired to maintain as uniform a radiation level as possible throughout dense phase 25, and for calculations of flux density as a function of source intensity and position, reference is made to such texts as Glasstone, "Principles of Nuclear Reactor Engineering" Van Nostrand, 1955. The average density of dense phase 25 particles at fluidization conditions is approximately 30 lbs. per cubic foot; this density value is employed in calculations to determine radiation intensity level throughout dense phase 25. Ordinarily, regenerator 5 is a steel vessel lined with several inches of refractionary concrete aggregate, and this type of construction affords excellent radiation shielding for biological protection.

FIGURES 3a through 3d illustrate several geometrical arrangements of radiation sources in top sectional views of different regenerators. The simplest arrangement, shown in FIGURE 3a, consists of a single high intensity source positioned axially of a regenerator; this arrangement is optimum in relatively small size (5–10 feet in diameter) conversion units, particularly when a relatively high intensity source is available. Source 32 may be inserted either upward or downward into the regenerator dense phase.

In FIGURE 3b, an arrangement is shown which is imminently suitable both for small and large regenerators. A single high intensity source 32 and a plurality of sources 32a, 32b, etc., is arranged equally around the periphery of one or more circles having source 32 for a center. Sources 32a and 32b may have the same intensity as center source 32 or may be of greater or lesser strength. This arrangement is capable of providing relatively homogeneous gamma ray flux throughout the regenerator. As in FIGURE 3a, the sources in FIGURE 3b may be inserted through either the upper or lower head of the regenerator. In FIGURE 3c an arrangement of radiation sources is shown which is especially suitable where a source is comprised of spent reactor fuel elements which are of conventional size, e.g. 4–6 ft. long and about 4–6 inches in diameter. The fuel elements themselves are thin tubular structures which may for example be round, square or hexagonal in cross-section, and are suitably shielded from direct contact with the regenerator atmosphere. According to the arrangement of FIGURE 3c, fuel elements 32 and 32a, etc., are inserted at one or more levels chordially into the regenerator along parallel planes. FIGURE 3d is an alternative arrangement of spent reactor fuel elements inserted radially at one or more levels into a regenerator. This latter arrangement is particularly efficacious in relatively large regenerators, e.g. 10–40 ft. in diameter, and may include brackets or tie rods or the like for supporting the fuel element sources at their centers or ends.

Turning now to FIGURE 2, a preferred installation is therein depicted for inserting a radioactive source into a regenerator for fluidized catalysts. This installation may be used with spent fuel elements or with any other source of nuclear radiation, e.g. cylinders, plates, rods or slugs of gamma-active radioactive isotopes and may be used either for horizontal or vertical insertion into a regenerator. In the installation as portrayed in FIGURE 2, a spent reactor fuel element is used, and is inserted horizontally into regenerator 5. Regenerator 5 is composed of a generally cylindrical steel shell 48 lines with from about 4 to about 20 inches of insulating cement material 33. Through the entire wall section, a hole 34 is provided. Flanged fitting 35 and gate valve 36 are secured to wall 48. A packing gland 38 is flange-connected to valve 36, and contains asbestos or similar heat-resistive packing 39 which is compressed by means of follower 40 when advanced into gland portion 38 by means of bolts 39 and 39a. Fuel element 32 is contained within a tubular member 41, which is sealed at the interior end 42 and has a removable seal at the opposite end 43, the seal comprising a flanged member adapted to provide fluid-tight engagement with the end of tubular member 41. Inserted into tubular member 41 is a radiation-impermeable barrier 44 of cement or similar dense material for the purpose of preventing radiation emitted from fuel element 32 from leaving regenerator vessel 5. Preferably, outside end 43 of tubular member 41 is of a design which permits both fuel element 32 and radiation barrier 44 to be withdrawn from the member, either while the member is on stream or after it is withdrawn from the regenerator 5.

A particular advantage of the arrangement shown in FIGURE 2 is that tubular member 41 with source 32 therein may be inserted into, and withdrawn from, regenerator 5 while the catalytic conversion unit is onstream. To accomplish this insertion, valve 36 is initially closed and sealing gland 38 is loosened. A non-oxidizing and non-combustible gas such as steam or nitrogen is admitted into the bonnet of valve 36 for the purpose of maintaining said bonnet free of catalyst particles. Tubular member 41 is then inserted through gland 38 until it abuts the gate of valve 36. Bolts 39 and 39a are tightened to wiping relationship with tubular member 41, after which valve 36 is opened and tubular member 41 forced into regenerator vessel 5 by a jack or similar device. Tubular member 41 may be locked in place either by further tightening of bolts 39 and 39a or by the use of other clamping means.

Because the abrasive effect of catalyst particles on most metals may eventually cause failure of tubular member 41 and erosion of the radioactive source, which can result in dangerous contamination of the entire catalyst inventory, source 32 is protected against the inadvertent failure of tubular member 41 (and exposure of source 32 to erosion) by maintaining a pressure within tubular member 41 which is different from—either lower or higher than—the pressure within regenerator 5. Preferably, an inert (i.e. oxidation and radiation stable) gas such as carbon dioxide or nitrogen is maintained within the tubular member 41 at a pressure higher than that within regenerator 5, and any change in pressure which may occur through erosion of tubular member 41 is indicated on gauge 46. Gauge 46 may be connected to a pressure transmitter for remote indication and monitoring of the inert gas pressure. Inert gas may be admitted, sampled, or withdrawn by means of valve 47.

The foregoing presentation was concerned primarily with the use of nuclear radiation in fluid catalytic cracking units. Fluid hydroformers employ similar fluidized catalyst processing techniques and use as catalysts finely divided molybdenum-alumina, cobalt-alumina, platinum-alumina or chromium-alumina, etc. In the presence of these catalysts, and in the presence of a hydrogen-containing atmosphere, naphthas boiling within a range of about 200–400° F. are subjected to conditions which alter the molecular configuration of the hydrocarbons to produce a highly aromatic product which may be used in motor gasolines, aviation gasolines, or in the preparation of pure aromatic compounds such as benzene, toluene, and xylenes.

Reaction conditions may be from about 800 to about 1100° F., at a pressure between about 25 and 500 p.s.i.g. For regeneration, the temperature is within a range of about 900 to about 1100° F. and the pressure between about 25 and 500 p.s.i.g. The installation, arrangement, and use of radiation sources in fluid hydroforming units are similar to those in fluid catalytic cracking, although the pressures expected in hydroforming may necessitate heavier structures.

From the foregoing discussion and specific embodiments, it is evident that the present invention provides a desirable and useful method for increasing the capacity of existing fluid catalytic conversion units by increasing the rate and efficiency of catalyst regeneration. Furthermore, regenerators of conversion units yet to be built may be constructed in smaller sizes for the same unit capacity by incorporating high intensity sources in the regenerators to increase the burning rate. Hitherto available methods for increasing the burning capacity of regenerators relied on either longer regenerator residence times—which exposed the catalyst to risk of loss through the regenerator cyclones and stack—or higher regenerator temperatures—which caused catalyst sintering. By contrast, the present inventive process provides a method for increasing the conversion level and/or feedstock throughput rate of catalytic conversion units without incurring the penalty of excessive catalyst loss which has been prevalent in many prior units.

Having described the invention, what is claimed is:

1. In a process for the catalytic conversion of hydrocarbons wherein said hydrocarbons, in gaseous form, are intimately contacted with a fluidized particulate solid hydrocarbon conversion catalyst in a reaction zone, and during said contact the catalyst becomes coated with carbonaceous deposits and wherein the activity of said catalyst is maintained by withdrawing catalyst from said reaction zone and cycling said catalyst to a regeneration zone in which the catalyst is contacted with an oxygen-containing gas under combustion conditions to remove said deposits, the improvement whereby the rate of combustion of said carbonaceous deposits is increased which comprises maintaining in said regeneration zone high energy ionizing radiation of an intensity sufficient to increase the combustion rate of said carbonaceous deposits, said intensity being effective to provide a dosage of at least about 10,000 roentgens per hour throughout a major portion of said zone.

2. Process of claim 1 wherein said radiation is predominantly gamma radiation.

3. Process of claim 1 wherein the source of radiation comprises spent nuclear reactor fuel elements.

4. Process of claim 1 wherein the source of radiation comprises cobalt 60.

5. Process of claim 1 wherein the source of radiation comprises mixed nuclear reactor fission products.

6. Process of claim 1 in which the catalytic conversion process is catalytic cracking.

7. Process of claim 1 in which the catalytic conversion process is catalytic hydroforming.

References Cited in the file of this patent

UNITED STATES PATENTS

| | | |
|---|---|---|
| 2,856,350 | Love | Oct. 14, 1958 |
| 2,873,176 | Hengstebeck | Feb. 10, 1959 |
| 2,905,608 | Noddings et al. | Sept. 22, 1959 |

OTHER REFERENCES

Kosiba et al.: "Advances in Catalysis," volume IX, Academic Press, pages 398–405 (1957).